(12) United States Patent
Uchida et al.

(10) Patent No.: US 10,847,181 B2
(45) Date of Patent: *Nov. 24, 2020

(54) MAGNETIC RECORDING MEDIUM

(71) Applicant: FUJI ELECTRIC CO., LTD., Kawasaki-shi, Kanagawa (JP)

(72) Inventors: Shinji Uchida, Matsumoto (JP); Hitoshi Nakata, Matsumoto (JP); Tomohiro Moriya, Matsumoto (JP); Akira Furuta, Matsumoto (JP); Takehito Shimatsu, Sendai (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 254 days.

This patent is subject to a terminal disclaimer.

(21) Appl. No.: 15/856,036

(22) Filed: Dec. 27, 2017

(65) Prior Publication Data

US 2018/0122415 A1    May 3, 2018

Related U.S. Application Data

(63) Continuation of application No. PCT/JP2017/000160, filed on Jan. 5, 2017.

(30) Foreign Application Priority Data

Jan. 12, 2016  (JP) ................. 2016-003577

(51) Int. Cl.
  G11B 5/73        (2006.01)
  G11B 5/65        (2006.01)
  C03C 17/36       (2006.01)

(52) U.S. Cl.
  CPC ........ G11B 5/7379 (2019.05); C03C 17/3649 (2013.01); G11B 5/65 (2013.01);
  (Continued)

(58) Field of Classification Search
  None
  See application file for complete search history.

(56) References Cited

U.S. PATENT DOCUMENTS

2006/0002026 A1    1/2006  Stipe et al.
2007/0259214 A1   11/2007  Takahashi et al.
(Continued)

FOREIGN PATENT DOCUMENTS

CN    104347086 A    2/2015
JP    2006-019000 A  1/2006
(Continued)

OTHER PUBLICATIONS

Singh et al. Journal of Nanoscience and Nanotechnology, vol. 7, pp. 2192-2196, 2007 (Year: 2007).*

*Primary Examiner* — Holly C Rickman
(74) *Attorney, Agent, or Firm* — Rabin & Berdo, P.C.

(57) ABSTRACT

The purpose of the present invention is to provide a perpendicular magnetic recording medium which uses an Ru seed layer having a (002)-oriented hcp structure, and has a magnetic recording layer including a (001)-oriented $L1_0$ ordered alloy suitable to perpendicular magnetic recording. The magnetic recording medium of the present invention includes a substrate, a first seed layer containing Ru, a second seed layer containing ZnO, a third seed layer containing MgO, and a magnetic recording layer containing an ordered alloy, in this order, the first seed layer having the (002)-oriented hexagonal closest packed structure.

8 Claims, 2 Drawing Sheets

(52) U.S. Cl.
CPC ............ *G11B 5/653* (2013.01); *G11B 5/7325* (2013.01); *C03C 2217/228* (2013.01); *C03C 2217/252* (2013.01); *C03C 2217/254* (2013.01); *C03C 2217/258* (2013.01); *C03C 2217/259* (2013.01); *C03C 2217/261* (2013.01); *C03C 2218/156* (2013.01)

(56) References Cited

U.S. PATENT DOCUMENTS

| | | |
|---|---|---|
| 2012/0237798 A1 | 9/2012 | Iwasaki et al. |
| 2015/0029830 A1 | 1/2015 | Zhang et al. |
| 2015/0206547 A1 | 7/2015 | Iwasaki et al. |

FOREIGN PATENT DOCUMENTS

| | | |
|---|---|---|
| JP | 2006-155865 A | 6/2006 |
| JP | 2009-134797 A | 6/2009 |
| JP | 2012-014750 A | 1/2012 |
| JP | 2012-195027 A | 10/2012 |
| JP | 2013-054819 A | 3/2013 |
| JP | 2015-026411 A | 2/2015 |
| JP | 2015-135713 A | 7/2015 |

\* cited by examiner

MAGNETIC RECORDING MEDIUM

CROSS-REFERENCE TO RELATED APPLICATIONS

This application is a continuation application of PCT Application No. PCT/JP2017/000160 filed on Jan. 5, 2017 under 37 Code of Federal Regulation § 1.53 (b) and the PCT application claims the benefit of Japanese Patent Application No. 2016-003577 filed on Jan. 12, 2016, all of the above applications being hereby incorporated by reference wherein in their entirety.

BACKGROUND OF THE INVENTION

Field of the Invention

The present invention relates to a magnetic recording medium. In particular, the present invention relates to a magnetic recording medium used in a hard disc magnetic recording device (HDD).

Description of the Related Art

Perpendicular magnetic recording system is adopted as a technique for achieving high-density magnetic recording. A perpendicular magnetic recording medium at least comprises a non-magnetic substrate and a magnetic recording layer formed of a hard-magnetic material. Optionally, the perpendicular magnetic recording medium may further comprise: a soft-magnetic under layer which is formed from soft-magnetic material and plays a role in concentrating the magnetic flux generated by a magnetic head onto the magnetic recording layer; an orientation controlling layer and/or a seed layer for orienting the hard-magnetic material in the magnetic recording layer in an intended direction; a protective layer for protecting the surface of the magnetic recording layer; and the like.

The magnetic recording layer of the perpendicular magnetic recording medium formed of a granular magnetic material has been proposed, for the purpose of obtaining good magnetic properties. The granular magnetic material comprises magnetic crystal grains and a non-magnetic body segregated to surround the magnetic crystal grains. Respective magnetic crystal grains in the granular magnetic material are magnetically separated from each other with the non-magnetic body.

For the purpose of further increasing the recording density of the perpendicular magnetic recording medium, a need for reduction in the grain diameter of the magnetic crystal grains in the granular magnetic material arises in recent years. On the other hand, the reduction in the grain diameter of the magnetic crystal grains leads to a decrease in thermal stability of the recorded magnetization (signals). Thus, the magnetic crystal grains in the granular magnetic material need to be formed of a material with higher magnetocrystalline anisotropy, in order to compensate the decrease in thermal stability due to the reduction in the grain diameter of the magnetic crystal grains. Various $L1_0$ ordered alloys are proposed as the material having the required higher magnetocrystalline anisotropy. Typical $L1_0$ ordered alloys include FePt, CoPt, FePd, CoPd, and the like.

In the prior-art perpendicular magnetic recording medium having a magnetic recording layer comprising a CoCrPt-based magnetic alloy, a seed layer consisting of Ru or Ru alloy is used for orienting the axis of easy magnetization of the CoCrPt-based magnetic alloy in the magnetic recording layer in the perpendicular direction, wherein the seed layer has a (002)-oriented hexagonal closest packed (HCP) structure. For example, Japanese Patent Laid-Open No. 2012-195027 and Japanese Patent Laid-Open No. 2013-054819 propose a discrete magnetic recording medium and a patterned magnetic recording medium which comprise the seed layer comprising Ru and the magnetic recording layer comprising the CoCrPt-based magnetic alloy. In these proposals, the seed layer is a stacked body of an Ru layer and an Ru alloy layer. These proposals disclose a seed layer consisting the single Ru layer, and a seed layer which is a stacked body of the Ru layer and a Ru-containing layer having a granular structure comprising Ru and an oxide, as comparative examples. Further, Japanese Patent Laid-Open No. 2015-135713 proposes a discrete magnetic recording medium and a patterned magnetic recording medium which comprise a grain size control layer comprising Ru as a principal component which is divided into plural parts by metal oxide posts, and a magnetic recording layer comprising the CoCrPt-based magnetic alloy. This proposal discloses the grain size control layer consisting of Ru and $Al_2O_3$, as a comparative example.

However, it is considered difficult to use a seed layer consisting of Ru and having (002)-oriented hcp structure, in the case where the magnetic recording layer comprising the $L1_0$ ordered alloy is formed. This is because it has been considered that the (001) face of the $L1_0$ ordered alloy, which is a four-fold symmetric square, is not epitaxially grown on the six-fold symmetric (002) face of the hcp structure.

To this problem, Japanese Patent Laid-Open No. 2012-014750 proposes a magnetic recording medium in which a magnetic recording layer consisting of a (001)-oriented $L1_0$ ordered alloy is formed onto a seed layer consisting of Ru or Ru alloy and having a (110)-oriented hcp structure. Further, for manufacturing a tilted magnetic recording medium in which improvement in magnetic recording density can be expected, Japanese Patent Laid-Open No. 2006-019000 proposes a magnetic recording medium in which a magnetic recording layer consisting of a (111)-oriented $L1_0$ ordered alloy is formed onto a seed layer comprising Ru, Re or Os alloy and having a (100)-oriented hcp structure.

SUMMARY OF THE INVENTION

The purpose of the present invention is to provide a magnetic recording medium having a magnetic recording layer comprising an $L1_0$ ordered alloy having a (001) orientation suitable to perpendicular magnetic recording, by means of a Ru seed layer having a (002)-oriented hcp structure which has been used in prior-art magnetic recording media using the CoCrPt-based magnetic alloy.

One of constitutional examples of the magnetic recording medium of the present invention comprises a substrate, a first seed layer comprising Ru, a second seed layer comprising ZnO, a third seed layer comprising MgO, and a magnetic recording layer comprising an ordered alloy, in this order wherein the first seed layer has a (002)-oriented hexagonal closest packed structure. Here, the magnetic recording medium may further comprise an orientation controlling layer between the substrate and the first seed layer. Optionally, the magnetic recording medium may further comprise a non-magnetic intermediate layer consisting of Pt between the first seed layer and the second seed layer. Further, the ordered alloy may be an $L1_0$ ordered alloy comprising at least one element selected from the group consisting of Fe and Co, at least one element selected from the group consisting of Pt, Pd, Au, Ir and Rh. Here, the ordered alloy may further comprise at least one element selected from the group consisting of Ni, Mn, Cu, Ru, Ag, Au, and Cr. Preferably, the ordered alloy may be an $L1_0$ ordered alloy selected from the group consisting of FePt, CoPt, FePd and CoPd. Further, the magnetic recording layer may have a granular structure comprising magnetic crystal grains and a non-magnetic crystal grain boundary surrounding the magnetic crystal grains, wherein the magnetic crystal grains comprise the ordered alloy. Here, the non-magnetic crystal grain boundary may comprise a non-magnetic material selected from the group consisting of carbon, boron, an oxide and a nitride.

By adopting the above-described constitution, it is possible to obtain the magnetic recording medium having the magnetic recording layer comprising the $L1_0$ ordered alloy having the (001) orientation suitable to perpendicular magnetic recording, even when using the Ru-containing seed layer which has been considered difficult to use.

Further features of the present invention will become apparent from the following description of exemplary embodiments with reference to the attached drawings.

DESCRIPTION OF THE EMBODIMENTS

Figure 1:
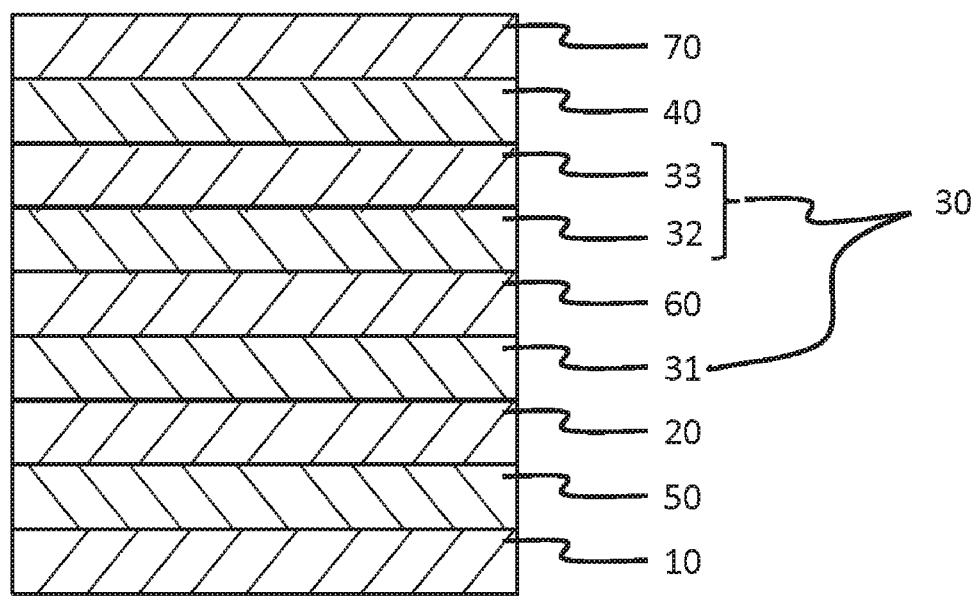
FIG. 1 is a schematic cross-sectional view showing one of constitutional examples of the magnetic recording medium of the present invention.

The magnetic recording medium according to an embodiment of the present invention comprises a substrate, a first seed layer comprising Ru, a second seed layer comprising ZnO, a third seed layer comprising MgO, and a magnetic recording layer comprising an ordered alloy, in this order. Here, the magnetic recording medium may further comprise an orientation controlling layer between the substrate and the first seed layer. According to one embodiment, the magnetic recording medium may further comprise a non-magnetic intermediate layer consisting of Pt between the first seed layer and the second seed layer. Further, the magnetic recording medium may further comprise layers commonly known in the art, such as an adhesive layer, a soft-magnetic under layer and/or a heat sink layer, between the substrate and the first seed layer, or between the substrate and the orientation controlling layer. In addition, the magnetic recording medium may further comprise layers commonly known in the art, such as a protective layer and/or a liquid lubricant layer, on or over the magnetic recording layer. FIG. 1 shows one of constitutional examples of the magnetic recording medium, which comprises substrate 10, orientation controlling layer 20, first seed layer 31, second seed layer 32, third seed layer 33, and magnetic recording layer 40.

The substrate 10 may be a plate-shaped member having a flat surface. For example, the substrate 10 may be formed of a material commonly used in magnetic recording media. The material comprises a NiP-plated Al alloy, monocrystalline MgO, $MgAl_2O_4$, $SrTiO_3$, tempered glass, crystallized glass, and the like.

The adhesive layer 50, which may be formed optionally, is used for enhancing the adhesion between the layer formed on the adhesive layer and the layer formed under the adhesive layer. In the embodiment illustrated in FIG. 1, the layer formed under the adhesive layer 50 includes the substrate 10. The material for forming the adhesive layer 50 may comprise a metal such as Ni, W, Ta, Cr or Ru, or an alloy containing the above-described metals. The adhesive layer may be a single layer or have a stacked structure with plural layers. The adhesive layer 50 preferable in this constitutional example consists of CrTi.

The soft-magnetic under layer (not shown), which may be formed optionally, controls the magnetic flux emitted from a magnetic head to improve the read-write characteristics of the magnetic recording medium. The material for forming the soft-magnetic under layer includes: a crystalline material such as an NiFe alloy, a sendust (FeSiAl) alloy, or a CoFe alloy; a microcrystalline material such as FeTaC, CoFeNi or CoNiP; and an amorphous material including a Co alloy such as CoZrNb or CoTaZr. The optimum thickness of the soft-magnetic under layer depends on the structure and characteristics of the magnetic head used in magnetic recording. When forming the soft-magnetic under layer continuously with other layers, the soft-magnetic under layer preferably has a thickness in a range from 10 nm to 500 nm (both inclusive), in view of productivity.

The heat sink layer (not shown) may be provided when the magnetic recording medium of this constitutional example is used in a heat-assisted magnetic recording system. The heat sink layer is a layer for effectively absorbing excess heat of the magnetic recording layer 40 that is generated during the heat-assisted magnetic recording. The heat sink layer can be formed of a material having a high thermal conductivity and a high specific heat capacity. Such material includes a Cu simple substance, an Ag simple substance, an Au simple substance, or an alloy material composed mainly of these substances. As used herein, the expression "composed mainly of" means that the content of the concerned material is 50% by weight or more. In consideration of its strength or the like, the heat sink layer can be formed of an Al—Si alloy, a Cu—B alloy, or the like. Further, the function of the soft-magnetic under layer, that is, the function of concentrating a perpendicular magnetic field generated by the head to the magnetic recording layer 40, can be imparted to the heat sink layer by forming the heat sink layer of a sendust (FeSiAl) alloy, a soft-magnetic CoFe alloy, or the like, and thereby capable of complementing the function of the soft-magnetic under layer. The optimum thickness of the heat sink layer depends on the amount and distribution of the heat generated during the heat-assisted magnetic recording, as well as the layer configuration of the magnetic recording medium and the thickness of the respective constituent layers. When forming the heat sink layer continuously with other constituent layers, the heat sink layer preferably has a thickness of 10 nm or more and 100 nm or less, in view of productivity. The heat sink layer can be formed by any process known in the art, such as a sputtering method or a vacuum deposition method. In general cases, the heat sink layer is formed by the sputtering method. The heat sink layer can be formed between the substrate 10 and the adhesive layer, between the adhesive layer and the orientation controlling layer 20, or the like, in consideration of properties required for the magnetic recording medium.

The orientation controlling layer 20 is a layer to make the first seed layer 31, which is formed thereon, have a (002)-oriented hcp structure. The orientation controlling layer 20 may be a single layer or have a stacked structure with plural layers. The orientation controlling layer 20 can be formed of materials used for forming a layer under the Ru-containing layer in the prior-art magnetic recording medium which has the magnetic recording layer comprising the CoCrPt-based magnetic alloy. This feature has been disclosed in Japanese Patent Laid-Open No. 2009-134797, for example. The material used for forming the orientation controlling layer 20 is preferably, but not limited to, a material having an hcp structure which is the same as the magnetic recording layer, or a material having a face-centered cubic (fcc) structure. For example, the material used for forming the orientation controlling layer 20 includes a Co—Ni-based alloy, an Ni alloy, a Pt alloy, a Pd alloy, a Ta alloy, a Cr alloy, an Si alloy, and a Cu alloy. Such material may further comprise one or more elements selected from the group consisting of Ru, W, Mo, Ta, Nb and Ti, in order to improve matching of the crystalline lattice size to that of the first seed layer 31. Alternatively, such material may further comprise one or more material selected from the group consisting of B, Mn, Al, Si oxide, and Ti oxide, in order to reduce the particle size of the first seed layer 31. The preferable orientation controlling layer 20 is formed of an RuCr alloy which comprises 50% by atom or more of Ru. Here, the RuCr alloy may comprise magnetic metal such as Fe, Ni or Co, in an amount of less than 10% by atom. The orientation controlling layer 20 preferable in this constitutional example has a stacked body of an NiTaAl alloy layer and an RuCrFe alloy layer. The orientation controlling layer 20 can be formed by any process known in the art, such as a sputtering method.

The first seed layer 31 comprises Ru or an Ru alloy. Preferably, the first seed layer 31 is formed of Ru. Here, Ru and the Ru alloy constituting the first seed layer 31 may contain unavoidable impurities. The first seed layer 31 has a (002)-oriented hcp structure. The first seed layer 31 can be formed by any process known in the art, such as a sputtering method.

The non-magnetic intermediate layer 60, which may be formed optionally between the first seed layer 31 and the second seed layer 32, is a layer for facilitating epitaxial growth of the second seed layer 32 and epitaxial growth of the layers formed after the second seed layer 32. In this constitutional example, the non-magnetic intermediate layer 60 can be formed of Pt. Further, the non-magnetic intermediate layer 60 can be formed by any process known in the art, such as a sputtering method.

The second seed layer 32 comprises ZnO. Here, ZnO may have stoichiometric composition or non-stoichiometric composition. In this constitutional example, ZnO in the second seed layer 32 has a (002)-oriented hexagonal closest packed structure, more specifically, a (002)-oriented wurtzite-type crystalline structure. In this constitutional example, ZnO includes a series of compounds having a peak in a range of $2\theta$ from 33.4° to 35.4° which is the typical peak in the ZnO crystal, in the XRD profile obtained by $\theta$-$2\theta$ measurement in a perpendicular-to-plane direction by means of X-ray diffraction. It is considered that the second seed layer 32 leads to (002) orientation in the third seed layer 33 comprising MgO, consequentially leading to (001) orientation in the magnetic recording layer 40. Further, it is considered that the small surface roughness of the second seed layer 32 comprising ZnO results in an effect to reduce crystalline orientation dispersion of the third seed layer 33. The second seed layer 32 preferably has a thickness in a range from 1 nm to 20 nm, in order to achieve the above-described effects. Further, the second seed layer 32 preferably comprises 70% by weight or more of ZnO, based on the total mass of the second seed layer 32, in order to achieve the above-described effects.

The third seed layer 33 comprises MgO. Here, MgO may have stoichiometric composition or non-stoichiometric composition. In this constitutional example, MgO in the third seed layer 33 has a (002)-oriented sodium chloride type crystalline structure. In this constitutional example, MgO includes a series of compounds having a peak in a range of $2\theta$ from 42.0° to 44.0° which is the typical peak in the MgO crystal, in the XRD profile obtained by $\theta$-$2\theta$ measurement in a perpendicular-to-plane direction by means of X-ray diffraction. It is considered that the third seed layer 33 leads to (001) orientation in the magnetic recording layer 40 formed thereon, consequentially reducing crystalline orientation dispersion of the magnetic recording layer 40. Further, it is considered that the third seed layer 33 facilitates magnetic separation of the magnetic crystal grains in the magnetic recording layer. The third seed layer 33 preferably has a thickness in a range from 1 nm to 20 nm, in order to achieve the above-described effects. Further, the third seed layer 33 preferably comprises 70% by weight or more of MgO, based on the total mass of the third seed layer 33, in order to achieve the above-described effects.

The second seed layer 32 and the third seed layer 33 can be formed by any process known in the art, such as a sputtering method. Here, the surface roughness of the third seed layer 33 comprising MgO can be reduced by heating of the substrate. The substrate temperature is preferably set in a range from 300° C. to 500° C., when the third seed layer 33 is formed. On the other hand, heating of the substrate is unnecessary in forming the second seed layer 32 comprising ZnO. The second seed layer 32 formed without heating of the substrate 10 can achieve the surface roughness equal to or less than that of the third seed layer 33 formed without heating of the substrate 10.

The seed layer 30 having the above-described stacked structure comprising the first seed layer 31, the second seed layer 32 and the third seed layer 33 allows to achieve the (001)-oriented crystalline orientation of the ordered alloy, especially the (001)-oriented crystalline orientation of the $L1_0$ ordered alloy, in the magnetic recording layer 40, which is suitable to the perpendicular magnetic recording medium.

The magnetic recording layer 40 comprises an ordered alloy. The ordered alloy may comprise at least one first element selected from the group consisting of Fe and Co, at least one second element selected from the group consisting of Pt, Pd, Au, Ir and Rh. The preferable ordered alloy may be an $L1_0$ ordered alloy selected from the group consisting of FePt, CoPt, FePd and CoPd. The ordered alloy may further comprise at least one element selected from the group consisting of Ni, Mn, Cu, Ru, Ag, Au, and Cr, for modification of properties. Desirable modification of properties includes: reduction in the temperature required for ordering of the $L1_0$ ordered alloy; and reduction in the heating temperature during recording in the heat-assisted magnetic recording process due to drop in Curie temperature.

The ratio of the first element to the second element may be set in a range from 0.7 to 1.3, preferably from 0.8 to 1.1, on a basis of the number of atoms, in the ordered alloy used in the present invention. The compositional ratio within the above-described range allows to obtain the $L1_0$ ordered structure exhibiting a large magnetic anisotropy constant Ku.

Alternatively, the magnetic recording layer may have a granular structure comprising magnetic crystal grains and a non-magnetic crystal grain boundary surrounding the magnetic crystal grains. The magnetic crystal grains may comprise the above-described ordered alloy. The non-magnetic crystal grain boundary may comprise a non-magnetic material selected from the group consisting of: an oxide such as $SiO_2$, $TiO_2$ and ZnO; a nitride such as SiN and TiN; carbon (C); boron (B); and the like.

Further, the magnetic recording layer 40 may consist of a plurality of magnetic layers. Each of the plurality of magnetic layers may have either of a non-granular structure or the granular structure. Further, the magnetic recording layer 40 may have an exchange-coupled composite (ECC) structure in which a coupling layer such as Ru is interposed between the magnetic layers. Further, a second magnetic layer may be disposed on the top of the magnetic layer having the granular structure, as a continuous layer not having the granular structure (CAP layer).

The magnetic recording layer 40 can be formed by depositing a predetermined material by a sputtering method. In the case to form the magnetic recording layer 40 comprising the ordered alloy, a target comprising material for constituting the ordered alloy can be used. More specifically, a target comprising the above-described elements constituting the ordered alloy at the predetermined ratio can be used. Alternatively, the magnetic recording layer 40 may be formed by using a plurality of targets comprising a single element, and adjusting electric power applied to the respective targets to control the ratio of the elements. In the case of forming the magnetic recording layer 40 having a granular structure, a target comprising a material for forming the magnetic crystal grains and a material for forming the non-magnetic crystal grain boundary at the predetermined ratio can be used. Alternatively, the magnetic recording layer 40 may be formed by using a target comprising the material for forming the magnetic crystal grains and a target comprising the material for forming the non-magnetic crystal grain boundary, and adjusting electric power applied to the respective targets to control the constitutional ratio of the magnetic crystal grains and the non-magnetic crystal grain boundary. Here, in the case where the magnetic crystal grains are formed from the ordered alloy, a plurality of targets which separately comprise the elements constituting the ordered alloy may be used.

In the case where the magnetic recording layer 40 comprises the ordered alloy, heating of the substrate 10 is involved when the magnetic recording layer 40 is formed. The substrate temperature in this case is within a range from 300° C. to 600° C. Adoption of the substrate temperature within this range allows improvement in the order parameter of the ordered alloy in the magnetic recording layer 40.

The protective layer (70), which may be formed optionally, can be formed of a material conventionally used in the field of magnetic recording media. Specifically, the protective layer 70 can be formed of non-magnetic metal such as Pt, a carbon-based material such as diamond-like carbon, or silicon-based material such as silicon nitride. The protective layer 70 may be a single layer or have a stacked structure. The stacked structure of the protective layer 70 may be a stacked structure of two types of carbon-based material having different characteristics from each other, a stacked structure of a metal and a carbon-based material, or a stacked structure of a metallic oxide film and a carbon-based material, for example. The protective layer 70 can be formed by any process known in the art such as a sputtering method, a CVD method, or a vacuum deposition method.

The liquid lubricant layer (not shown), which may be formed optionally, can be formed of a material conventionally used in the field of magnetic recording media. For example, perfluoropolyether-based lubricants or the like can be used. The liquid lubricant layer can be formed by a coating method such as a dip-coating method or a spin-coating method.

Example 1

This example relates to a magnetic recording medium having seed layer 30 of a three-layered structure consisting of Ru first seed layer 31, ZnO second seed layer 32, and MgO third seed layer 33. First, a chemically strengthened glass substrate having a smooth surface (N-10 glass substrate manufactured by HOYA CORPORATION) was washed to prepare substrate 10. The washed substrate 10 was brought into a sputtering device. Then, CrTi adhesive layer having a thickness of 15 nm was formed by a DC magnetron sputtering method using a CrTi target in Ar gas at a pressure of 0.3 Pa. The substrate temperature in forming the CrTi adhesive layer was room temperature (25° C.). The sputtering power in forming the CrTi adhesive layer was 200 W.

Next, an NiTaAl film having a thickness of 4 nm was formed by a DC magnetron sputtering method using an NiTaAl target in Ar gas at a pressure of 0.3 Pa. The substrate temperature in forming the NiTaAl film was room temperature (25° C.). The sputtering power in forming the NiTaAl film was 200 W. Subsequently, an RuCrFe film having a thickness of 3.5 nm was formed by a DC magnetron sputtering method using an RuCrFe target in Ar gas at a pressure of 0.3 Pa, to obtain orientation controlling layer 20 consisting the NiTaAl film and the RuCrFe film. The substrate temperature in forming the RuCrFe film was room temperature (25° C.). The sputtering power in forming the RuCrFe film was 200 W.

Next, the Ru first seed layer 31 having a thickness of 6 nm was formed by a DC magnetron sputtering method using an Ru target in Ar gas at a pressure of 0.3 Pa. The substrate temperature in forming the Ru first seed layer 31 was room temperature (25° C.). The sputtering power in forming the Ru first seed layer 31 was 200 W.

Next, the ZnO second seed layer 32 having a thickness of 2 nm was formed by an RF magnetron sputtering method using a ZnO target in Ar gas at a pressure of 0.3 Pa. The substrate temperature in forming the ZnO second seed layer 32 was room temperature (25° C.). The sputtering power in forming the ZnO second seed layer 32 was 200 W.

Next, the MgO third seed layer 33 having a thickness of 5 nm was formed by an RF magnetron sputtering method using an MgO target in Ar gas at a pressure of 0.016 Pa. The substrate temperature in forming the MgO third seed layer 33 was 400° C. The sputtering power in forming the MgO third seed layer 33 was 200 W.

Next, the FePt magnetic recording layer 40 having a thickness of 10 nm was formed on the MgO third seed layer 33 by a DC magnetron sputtering method using an Fe target and a Pt target in Ar gas at a pressure of 1.0 Pa. The substrate temperature in forming the FePt magnetic recording layer 40 was set to 400° C. Further, electric power of 50 W was applied to the Fe target, and electric power of 17 W was applied to the Pt target.

Finally, a Pt film having a thickness of 5 nm was formed by a DC magnetron sputtering method using a Pt target in Ar gas at a pressure of 0.3 Pa. Subsequently, a Ta film having a thickness of 5 nm was formed by a DC magnetron sputtering method using a Ta target in Ar gas at a pressure of 0.3 Pa, to form a protective layer 70 having a stacked structure of the Pt film and the Ta film, thereby obtaining a magnetic recording medium. The substrate temperature in forming the Pt film and in forming the Ta film was room temperature (25° C.). The sputtering power in forming the Pt film was 50 W, and the sputtering power in forming the Ta film was 200 W.

Figure 2:
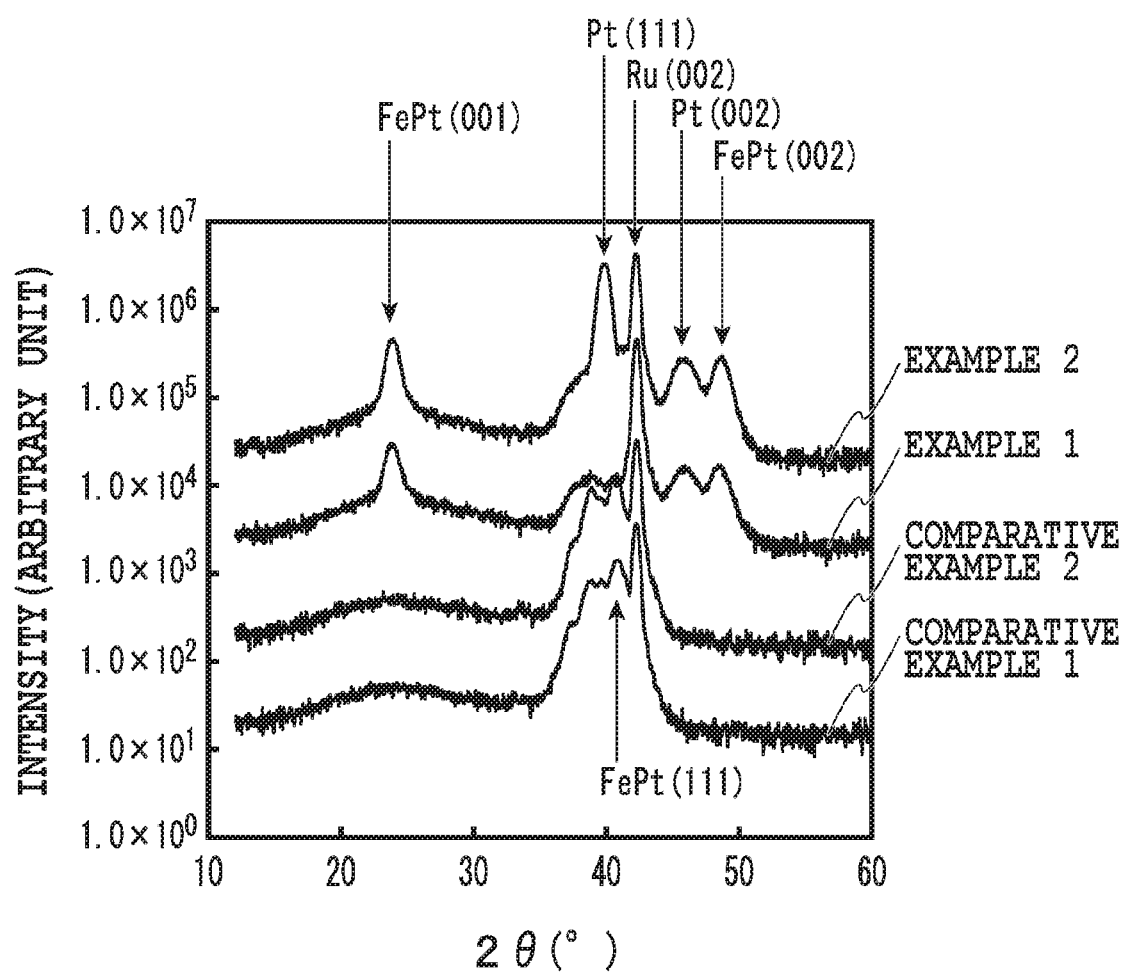
FIG. 2 is a graphical representation showing XRD spectra of the magnetic recording media of Examples and Comparative Examples.

The resultant magnetic recording medium was analyzed by an X-ray diffraction method (XRD) to confirm the presence or absence of: (001) FePt peak, (002) FePt peak, and (111) FePt peak resulting from the FePt magnetic recording layer 40; (111) Pt peak and (002) Pt peak resulting from a Pt non-magnetic intermediate layer 60; and (002) Ru peak resulting from the Ru first seed layer. The XRD spectrum of the resultant magnetic recording medium is shown in FIG. 2.

Example 2

This example relates to a magnetic recording medium having seed layer 30 of a four-layered structure consisting of Ru first seed layer 31, non-magnetic intermediate layer 60, ZnO second seed layer 32, and MgO third seed layer 33.

The layers up to the Ru first seed layer 31 was formed by repeating the procedure of Example 1. Subsequently, Pt non-magnetic intermediate layer 60 having a thickness of 10 nm was formed by a DC magnetron sputtering method using a Pt target in Ar gas at a pressure of 0.3 Pa. The substrate temperature in forming the Pt non-magnetic recording layer was room temperature (25° C.). The sputtering power in forming the Pt non-magnetic recording layer was 200 W.

Subsequently, the ZnO second seed layer 32, the MgO third seed layer 33, the FePt magnetic recording layer 40 and the protective layer 70 were formed by repeating the procedure of Example 1, to obtain a magnetic recording medium. The XRD spectrum of the resultant magnetic recording medium is shown in FIG. 2.

Comparative Example 1

This example relates to a magnetic recording medium having Ru first seed layer 31 only, but not having ZnO second seed layer 32 or MgO third seed layer 33. A magnetic recording medium was formed by repeating the procedure of Example 1, except that the ZnO second seed layer 32 and the MgO third seed layer 33 were not formed. The XRD spectrum of the resultant magnetic recording medium is shown in FIG. 2.

Comparative Example 2

This example relates to a magnetic recording medium having Ru first seed layer 31 and MgO third seed layer 33, but not having ZnO second seed layer 32. A magnetic recording medium was formed by repeating the procedure of Example 1, except that the ZnO second seed layer 32 was not formed. The XRD spectrum of the resultant magnetic recording medium is shown in FIG. 2.

(Evaluation)

Integrated intensities of the (001) FePt peak and the (002) FePt peak obtained by the XRD are shown in Table 1, in regard to magnetic recording media of Examples 1 and 2, and Comparative Examples 1 and 2.

TABLE 1

Layer construction of the magnetic recording medium and crystalline orientation of the FePt magnetic recording layer

|  | Ex. 1 | Ex. 2 | C. Ex. 1 | C. Ex. 2 |
|---|---|---|---|---|
| Thickness (nm) | | | | |
| Ru first seed layer | 6 | 6 | 6 | 6 |
| Pt non-magnetic intermediate layer | — | 10 | — | — |
| ZnO second seed layer | 2 | 2 | — | — |
| MgO third seed layer | 5 | 5 | — | 5 |
| Integrated intensities of XRD peaks | | | | |
| (001) FePt | 11266 | 19493 | 0 | 0 |
| (002) FePt | 10514 | 18036 | 0 | 0 |

As understood from FIG. 2, the (002) Ru peak resulting from the Ru first seed layer was observed in all of the magnetic recording media of Examples 1 and 2 and Comparative Examples 1 and 2. This result shows that the Ru first seed layer 31 having (002) orientation and an hcp structure was obtained due to the orientation controlling layer 20 used in the above-described examples.

In the magnetic recording medium of Comparative Example 1 having the Ru first seed layer 31 only, but not having the ZnO second seed layer 32 or the MgO third seed layer 33, neither the (001) FePt peak nor the (002) FePt peak were observed in XRD. Instead, the (111) FePt peak, indicating inclination of the axis of easy magnetization, was observed in the magnetic recording medium of Comparative Example 1. Further, in the magnetic recording medium of Comparative Example 2 having the Ru first seed layer 31 and the MgO third seed layer 33 but not having the ZnO second seed layer 32, neither the (001) FePt peak nor the (002) FePt peak were observed, but the (111) FePt peak was observed, similarly. On the contrary, in the magnetic recording media of Examples 1 and 2 having all of the Ru first seed layer 31, the ZnO second seed layer 32, and the MgO third seed layer 33, the (001) FePt peak and the (002) FePt peak were observed, but the (111) FePt peak was not observed. In view of the above-described result, it becomes apparent that both of the ZnO second seed layer 32 and the MgO third seed layer 33 are necessary to obtain the FePt magnetic recording layer having the (001)-oriented $L1_0$ ordered structure in which the axis of easy magnetization is desirably oriented perpendicularly.

Further, in the magnetic recording medium of Example 2 in which the Pt non-magnetic intermediate layer 60 is formed between the Ru first seed layer 31 and the ZnO second seed layer 32, the (111) Pt peak and the (002) Pt peak were observed. This result shows that the Pt non-magnetic intermediate layer 60 is formed of Pt having a (111)-oriented fcc structure.

Further, based on the results shown in Table 1, the magnetic recording medium of Example 2 exhibits greater integrated intensities for both of the (001) FePt peak and the (002) FePt peak, than those of the magnetic recording medium of Example 1. This result shows that the epitaxial growth of the FePt magnetic recording layer 40 is facilitated by the presence of the Pt non-magnetic intermediate layer 60, to result in the FePt magnetic recording layer 40 having the more desirable crystalline structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. All of the patent applications and documents cited herein are incorporated herein by reference in their entirety.

What is claimed is:

1. A magnetic recording medium, comprising:
   a substrate;
   a first seed layer comprising Ru on the substrate;
   a second seed layer comprising ZnO on the first seed layer;
   a third seed layer comprising MgO on the second seed layer;
   and a magnetic recording layer comprising an ordered alloy on the third seed layer, wherein the first seed layer has a (002)-oriented hexagonal closest packed structure.

2. The magnetic recording medium according to claim 1, further comprising an orientation controlling layer between the substrate and the first seed layer for controlling an orientation of the first seed layer.

3. The magnetic recording medium according to claim 1, further comprising a non-magnetic intermediate layer consisting of Pt between the first seed layer and the second seed layer.

4. The magnetic recording medium according to claim 1, wherein the ordered alloy is an $L1_0$ ordered alloy comprising at least one element selected from the group consisting of Fe and Co, at least one element selected from the group consisting of Pt, Pd, Au, Ir and Rh.

5. The magnetic recording medium according to claim 4, wherein the ordered alloy further comprises at least one element selected from the group consisting of Ni, Mn, Cu, Ru, Ag, Au, and Cr.

6. The magnetic recording medium according to claim 4, wherein the ordered alloy is the $L1_0$ ordered alloy selected from the group consisting of FePt, CoPt, FePd and CoPd.

7. The magnetic recording medium according to claim 1, wherein the magnetic recording layer has a granular structure comprising magnetic crystal grains and a non-magnetic crystal grain boundary surrounding the magnetic crystal grains, and the magnetic crystal grains comprise the ordered alloy.

8. The magnetic recording medium according to claim 7, wherein the non-magnetic crystal grain boundary comprises a non-magnetic material selected from the group consisting of carbon, boron, an oxide and a nitride.

* * * * *